(12) United States Patent
Spieth

(10) Patent No.: US 10,190,473 B2
(45) Date of Patent: Jan. 29, 2019

(54) SUPPORT UNIT FOR SUPPORTING AN EXHAUST SYSTEM OF A VEHICLE

(71) Applicant: Eberspächer Exhaust Technology GmbH & Co. KG, Neunkirchen (DE)

(72) Inventor: Arnulf Spieth, Hochdorf (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 78 days.

(21) Appl. No.: 15/019,299

(22) Filed: Feb. 9, 2016

(65) Prior Publication Data

US 2016/0230636 A1 Aug. 11, 2016

(30) Foreign Application Priority Data

Feb. 10, 2015 (DE) .................. 10 2015 101 845

(51) Int. Cl.
*F01N 13/08* (2010.01)
*F01N 13/18* (2010.01)
*B60K 13/04* (2006.01)

(52) U.S. Cl.
CPC .............. *F01N 13/08* (2013.01); *B60K 13/04* (2013.01); *F01N 13/1822* (2013.01)

(58) Field of Classification Search
CPC ..... B60K 13/04; F01N 13/08; F01N 13/1822; F01N 13/1805; F01N 13/1855; F01N 13/1872; F01N 13/10; B60Y 2306/01
USPC .................................................. 60/322, 323
See application file for complete search history.

(56) References Cited

U.S. PATENT DOCUMENTS

| 1,704,303 | A | * | 3/1929 | Savage | .................. B63H 20/06 248/641 |
| 5,873,429 | A | | 2/1999 | Qutub | |
| 6,260,652 | B1 | * | 7/2001 | Steenackers | ........... B60K 13/04 180/296 |
| 2007/0169981 | A1 | | 7/2007 | Connelly | |
| 2010/0288401 | A1 | | 11/2010 | Hennings et al. | |
| 2010/0289239 | A1 | * | 11/2010 | Buschjohann | ........... B60G 7/02 280/124.1 |
| 2015/0101329 | A1 | | 4/2015 | Tiefenbacher et al. | |
| 2016/0121711 | A1 | | 5/2016 | Yano et al. | |

FOREIGN PATENT DOCUMENTS

| CN | 101855124 A | 10/2010 |
| CN | 104321242 A | 1/2015 |
| DE | 103 46 704 A1 | 5/2005 |
| DE | 10 2006 010 973 A1 | 9/2007 |
| DE | 10 2008 055928 A1 | 8/2009 |
| FR | 2 601 738 A1 | 1/1988 |
| JP | 2016088159 A | 5/2016 |

OTHER PUBLICATIONS

M. Merkel; K.-H. Thomas: Taschenbuch der Werkstoffe. Leipzig: Carl Hanser Verlag, 2000. 300-304. -ISBN 3-446-21410-0.

* cited by examiner

*Primary Examiner* — Phutthiwat Wongwian
*Assistant Examiner* — Diem Tran
(74) *Attorney, Agent, or Firm* — McGlew and Tuttle, P.C.

(57) ABSTRACT

A support unit for supporting an exhaust system (18) of a vehicle comprises at least one support element (26) made of light metal die-cast material.

17 Claims, 1 Drawing Sheet

SUPPORT UNIT FOR SUPPORTING AN EXHAUST SYSTEM OF A VEHICLE

CROSS REFERENCE TO RELATED APPLICATIONS

This application claims the benefit of priority under 35 U.S.C. § 119 of German Patent Application DE 10 2015 101 845.4 filed Feb. 10, 2015, the entire contents of which are incorporated herein by reference.

FIELD OF THE INVENTION

The present invention pertains to a support unit, with which an exhaust system guiding waste gases away from an internal combustion engine of a vehicle can be supported.

BACKGROUND OF THE INVENTION

A drive system of a vehicle may comprise a drive unit with an internal combustion engine and with a transmission coupled with the internal combustion engine. Combustion waste gases, generated in the combustion operation of the internal combustion engine are guided by an exhaust system. In a front area of a vehicle, the exhaust system may be supported by, i.e., carried on a plurality of support units in relation to the drive unit and thus in relation to the rest of the vehicle. Various areas of the exhaust system may also be supported by means of one or more such support units in relation to one another in order to achieve a reinforcement and an increased stability.

In case of an impact of an obstacle in a front area of a vehicle, the obstacle acts on the drive unit and displaces same toward the vehicle interior space. Because of the rigid coupling of the exhaust system with the drive unit via the support units, the exhaust system may also be displaced. Since the support units generally used are made of steel plate material, there is basically a risk of the exhaust system being taken along by the drive unit and thus may cause damage and injuries in the vehicle interior space.

SUMMARY OF THE INVENTION

An object of the present invention is to provide a support unit for supporting an exhaust system of a vehicle, with which an increased safety for the persons located in a vehicle in case of a collision can be achieved.

According to the present invention, this object is accomplished by a support unit for supporting an exhaust system of a vehicle, comprising at least one support element made of light metal die-cast material.

The light metal die-cast material which is used for a support unit designed according to the present invention has a very high tensile strength and is thus suitable to establish a very stable connection between an exhaust system and, for example, a drive unit of a vehicle. Because of the brittleness of this material, the impact energy necessary to destroy a support element having such a design is, however, markedly lower than, for example, in a support element made of steel or steel plate material. This means that, in a collision, because of the easy destructibility of a support element designed according to the present invention, the exhaust system can be easily uncoupled from this supporting system area, i.e., for example, from a drive unit and thus the risk that the exhaust system is moved together with the drive unit or by the drive unit into the passenger interior space is markedly reduced.

The light metal die-cast material may contain Al or/and Mg and Si or/and Cu or/and Zn. In particular, the light metal die-cast material may advantageously be an Al/Si alloy or an Al/Mg alloy or an Al/Si/Mg alloy or an Al/Si/Cu alloy. In a support unit according to the present invention, the light metal die-cast material comprises Al or/and Mg and Si or/and Cu or/and Zn such as an Al/Si alloy or an Al/Mg alloy or an Al/Si/Mg alloy or an Al/Si/Cu alloy.

To be able to couple the support unit according to the present invention or the support element of same made of light metal die-cast material with various system areas, i.e., for example, with an exhaust system, on the one hand, and with a drive unit or the like of a vehicle, on the other hand, in a simple manner, a first connecting element provided for the rigid connection to a first system area and coupled or to be coupled with at least one support element in a first coupling area and a second connecting element provided for the rigid connection to a second system area and coupled or to be coupled with at least one support element in a second coupling area may be provided. To be able in this connection to achieve a stable coupling of the support element to the connecting elements, it is suggested that the first connecting element be coupled or be able to be coupled with the support element in the first coupling area by means of at least one coupling element or/and that the second connecting element be coupled or be able to be coupled with the support element in the second coupling area by means of at least one coupling element, preferably at least one coupling element being able to be embodied as a bolt.

In case of a collision in a support unit according to the present invention, to be able to bring about the destruction of same in a better defined manner, it is suggested that at least one support element have at least one predetermined breaking point range. In order to be able to provide such a predetermined breaking point range in a simple manner, it is suggested that at least one predetermined breaking point range is defined by a configuration comprising a cross-sectional contraction or a recess or an opening traversing the support element or any combination of a cross-sectional contraction, a recess and an opening traversing the support element.

The present invention pertains, furthermore, to a drive system for a vehicle, comprising a drive unit with an internal combustion engine and an exhaust system guiding combustion waste gases away from the internal combustion engine, further comprising at least one support unit with the above-described design and configuration.

Provisions may be made in this connection, for example, for at least one support unit to be arranged for supporting the exhaust system in relation to the internal combustion engine or/and for the drive unit to comprise a transmission and for at least one support unit to be arranged for supporting the exhaust system in relation to the transmission, or/and for at least one support unit to be arranged for supporting a first area of the exhaust system in relation to a second area of the exhaust system.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
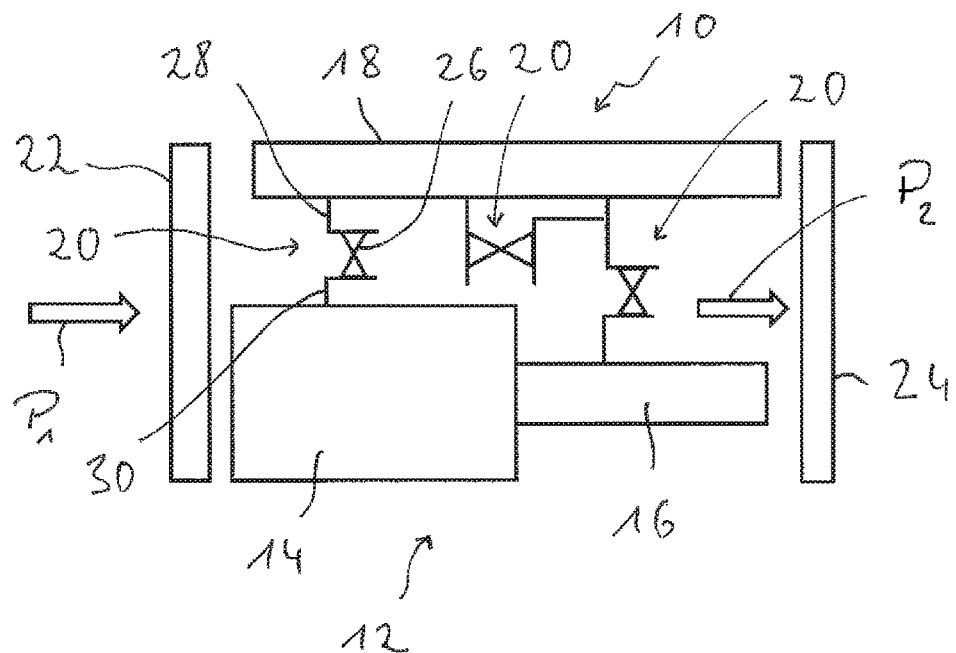
FIG. 1 is a schematic view of a drive system for a vehicle.

Referring to the drawings, FIG. 1 shows a schematic view of a drive system 10 of a vehicle. The drive system 10 comprises a drive unit 12 with an internal combustion engine 14 and with a transmission 16 coupled with the internal combustion engine 14. The combustion waste gases generated in the combustion operation of the internal combustion engine 14 are guided by an exhaust system, generally designated by 18, away from the internal combustion engine 14. The exhaust system 18 may comprise an exhaust elbow which is connected, for example, to the internal combustion engine 14 or may be connected to the internal combustion engine 14 via this exhaust elbow.

The shown drive system is for a front engine type vehicle. The drive unit 12 is arranged together with the exhaust system 18 or with a part of the exhaust system 18 in the direction of travel in front of a front wall 24 separating the vehicle interior space from the engine compartment. In the front area of the vehicle, the exhaust system 18 is supported by, i.e., carried on a plurality of support units 20 in relation to the drive unit 12 and thus in relation to the rest of the vehicle. Various areas of the exhaust system 18 itself can also be supported by means of one or more such support units 20 in relation to one another in order to achieve a reinforcement and an increased stability in the exhaust system 18 itself. The exhaust system 18 may in this connection comprise, for example, a plurality of exhaust gas pipes running partially also in a curved pattern or a catalytic converter area or/and muffler area and the like.

A support unit 20 according to the present invention, is used to support the exhaust system 18 in relation to a drive unit 12, i.e., for example, an internal combustion engine or a transmission, or to support various areas in the exhaust system itself on one another. The support unit 20 is comprised of a light metal die-cast material which has a tensile strength that is basically comparable to that of steel material, such that a stable supporting or holding of the exhaust system 18 on the vehicle, especially the drive unit 10, is guaranteed in the normal operation. Because of brittleness of the light metal die-cast material of the support unit 20, the material fractures considerably more easily than steel material in case of a sudden impact of an obstacle 22 in the direction of an arrow $P_1$ on the vehicle, in particular the front area of a vehicle. The obstacle 22 may act on the drive unit 12 to displace same in the direction towards the front wall 24. However, the exhaust system 18, via the support units 20, is not also displaced in the direction of an arrow $P_2$ towards the front wall 24.

Figures 2A, 2B, 2C:
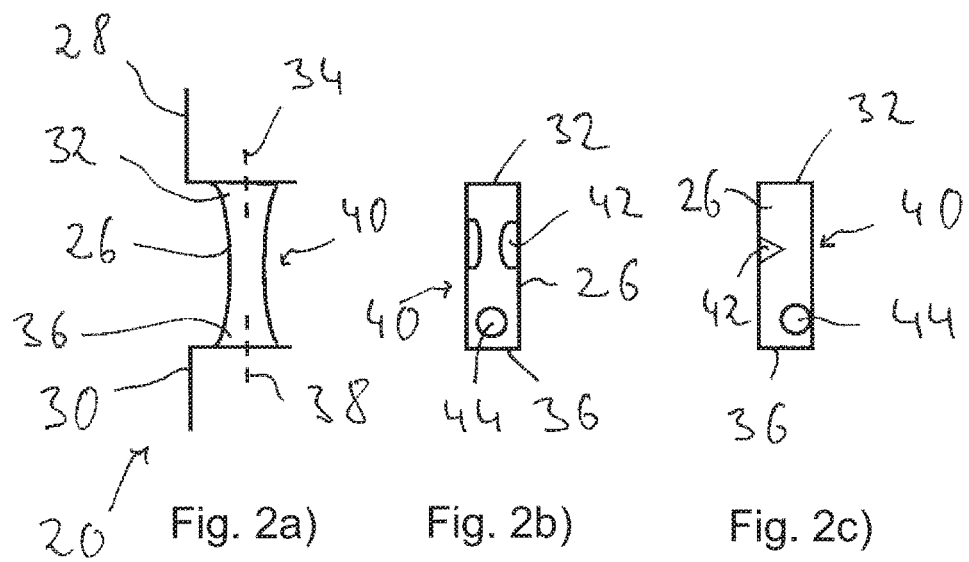
FIG. 2a is a view of one of various embodiments of a support unit.
FIG. 2b is a view of one of various embodiments of a support element.
FIG. 2c is a view of another of various embodiments of a support element.

FIG. 2a shows an example of a support unit 20 which can be used in the drive system 10 of FIG. 1. The support unit 20 comprises a support element 26, which is rigidly coupled with a first connecting element 28 and with a second connecting element 30. The two connecting elements 28, 30 may have an angular design, for example, as shown in the figures, but may also have any other geometric shape. They are preferably made of steel or steel plate material. The connecting element 28 can be connected, for example, to the exhaust system 18 as a first system area, while the connecting element 30 can be connected, for example, to the internal combustion engine 14 or the transmission 16 as a second system area. This connection may be carried out, for example, by a material connection, i.e., for example, by welding on, but may also be carried out by screwing on or/and clamping on.

The support element 26 may have a, for example, elongated configuration with a first coupling area 32, in which the first connecting element 28 is connected to the support element 26 using a first coupling element 34. For example, the first coupling element 34 may comprise a bolt, which can be screwed through the first connecting element 28 into a threaded opening in the first coupling area 32 of the support element 26.

In a second coupling area 36, the support element 26 is rigidly connected to the second connecting element 32 by means of a second coupling element 38. The second coupling element 38 may also be embodied as a bolt and be screwed through the second connecting element 30 into the second coupling area 36 of the support element 26.

The support element 26 is made of light metal die-cast material in the embodiment according to the present invention of a support unit 20. In this case, the support element 26 may be made of aluminum (Al) or/and magnesium (Mg) or alloys thereof. In particular, the following alloys may be used: AlSi9Cu3, AlMg3, AlMg5, AlMg9, AlSi10Mg, AlSi12Cu1, AlSi12. The substantial advantage of using light metal die-cast material for making the support element 26 is that this material of which the support element is made has a tensile strength that is basically comparable to that of steel material, such that a stable supporting or holding of the exhaust system on the vehicle, especially the drive unit 10, is guaranteed in the normal operation. Because of its brittleness, however, the light metal die-cast material fractures considerably more easily than steel material in case of a sudden impact. In particular, the impact energy necessary for destroying a support element 26 made of light metal die-cast material is lower by a factor of 4 to 5 than in support elements made of steel material. Because of this comparatively easy destructibility in case of impact stress, the exhaust system 18 is mostly separated from the drive unit 12, especially in a front-end collision, due to the destruction of the support elements 26 of the support units 20 which can also be seen in FIG. 1, with the support elements coupling the exhaust system 18 to the drive unit 12. A coupling remains only in the area of the direct connection of the exhaust system to the internal combustion engine 14 by means of the exhaust elbow. Because of the curved design of the exhaust elbow, this is, however, comparatively easy to deform. If, in this state, the drive unit 12 is moved by an obstacle 22 coming into contact with a vehicle backwards in the direction of the vehicle interior space, for example, towards the front wall 24, then, because of the extensive uncoupling of the exhaust system 18 from the drive unit 12 caused by the destruction of the support elements 26, the exhaust system 18 does not follow the movement of the drive unit 12 or does so with lower intensity, such that the risk that the exhaust system 18 will pass through the front wall 24 is markedly reduced. The fact that one or more support units 20, which support the exhaust system 18 in itself and thus reinforce the exhaust system 18, is equally destroyed, also contributes to this, such that the stability of the exhaust system 18 also decreases in itself, and in case of a collision of the exhaust system 18 on the front wall, a considerable part of the energy is also removed by the exhaust system 18 being deformed in itself.

In addition to the embodiment of the support elements 26 made of light metal die-cast material provided for the support units 20, the shape of the support elements 26 may also contribute to an easier destructibility in case of impact stress. Thus, it is seen that in the example of FIG. 2a), the support element 26 is formed with a spindle-like, for example, rotationally symmetrical, concave shape, such that a maximum diameter reduction or contraction providing a predetermined breaking point range 40 is present, for example, in the longitudinal central area of the support element 26. In the examples of FIGS. 2b) and 2c), the support element 26 can be formed with basically, for example, a cylindrical, preferably a circular cylindrical shape. Various scores or recesses 42 or openings 44 also traversing the support element 26, which contribute to forming defined predetermined breaking point ranges 40, may be provided on the outer circumferential area. Thus, the fracture behavior of a support element 26 designed according to the present invention can be affected in a defined manner by the selection of the material of which it is made, on the one hand, and the shape, on the other hand, such that various support elements 26 or support units 20 can be used, for example, also adapted to the site of installation or the system areas to be coupled with one another in the drive system 10.

In the above-described design according to the present invention of a support unit 20 and of a drive system 10 provided therewith, additional aspects can also be achieved, of course, in conjunction with one or more of the structural design features described above. Thus, the first and second connecting elements 28, 30 of a corresponding support unit 20 may, of course, be formed from different materials and adapted to the system areas with different shape to be connected thereto. As already explained, the connecting elements may be made of steel material, for example, steel plate material. Aluminum may also be used as the material of which they are made. In order to protect the connecting elements 28, 30 also against corrosion or heat stress, the connecting elements 28, 30 may, as an alternative to a basically uncoated design, also be coated with a coating. Of course, the connecting elements 28, 30 may be formed from one part or can be composed of multiple parts.

In order to protect the structural elements of a support unit 20 according to the present invention against excessive temperature stress, for example, heat-insulating elements, such as thin mica plates, mats or plates made of heat-insulating material or fiber composite material may be provided in the area of same adjoining one another. A sheathing of one or more of the structural elements with such a material is also possible. For providing an improved protection against corrosion, one or more of the structural elements of a support unit 20 according to the present invention may be coated, for example, with Teflon or plastic material. A surface treatment, for example, plasma treatment, eloxadizing, galvanizing, is also possible. Basically, the structural elements may also be coated with an anticorrosive alloy. The interstratification of anticorrosive layers, e.g., made of mica material or made of rubber material, is also possible.

The shapes of a support element for providing a defined breaking behavior, which can especially be seen in FIGS. 2a) through 2c), may, of course, be provided individually or in a combination. In particular, the recesses 42 or the through openings 44 may be provided on the support element 26 in a symmetrical or asymmetrical manner. The support element 26 may have a configuration that is basically rotationally symmetrical and elongated in the direction of a longitudinal axis of same. The cross section may have a, for example, circular, oval or angular shape. Material thickenings may be provided wherever the support element 26 is very heavily stressed, in particular also for fulfilling its support functionality. This can be seen, for example, in FIG. 2a), where the support element 26 is designed with greater material strength wherever it is coupled to the connecting elements 28, 30 by means of the coupling elements 34, 36.

There are also various possibilities for incorporating a support unit 20 stabilizing the exhaust system 18 in itself. Thus, as this can be seen in FIG. 1, one of the connecting elements of a support unit 20 may be connected directly to the exhaust system 18, while the other connecting element is connected to a connecting element of another support unit 20. As an alternative, both connecting elements of such a support unit 20 may be connected directly to the exhaust system 18.

While specific embodiments of the invention have been shown and described in detail to illustrate the application of the principles of the invention, it will be understood that the invention may be embodied otherwise without departing from such principles.

What is claimed is:

1. A support element for a support unit for supporting an exhaust system of a vehicle, the support element comprising at least one support element made of light metal die-cast material, wherein the at least one support element has at least one predetermined breaking point range defined by a cross-sectional contraction having a rotationally symmetrical concave shape, wherein the at least one predetermined breaking point range of the at least one support element is further defined by a configuration comprising a recess or an opening traversing the support element or any combination of a recess and an opening traversing the support element.

2. A support element in accordance with claim 1, wherein the light metal die-cast material contains Al, or Mg or both Al and Mg.

3. A support element in accordance with claim 1, wherein the light metal die-cast material contains Si or Cu or Zn or any combination of Si or Cu and Zn.

4. A support element in accordance with claim 1, wherein the light metal die-cast material is an Al and Si alloy or an Al and Mg alloy or an Al and Si and Mg alloy or an Al and Si and Cu alloy or any combination of an Al and Si alloy, an Al and Mg alloy, an Al and Si and Mg alloy and an Al and Si and Cu alloy.

5. A support element in accordance with claim 1, further comprising:
   a first connecting element rigidly connected to a first system area and coupled with the at least one support element in a first coupling area; and
   a second connecting element rigidly connected to a second system area and coupled with the at least one support element in a second coupling area.

6. A support element in accordance with claim 5, further comprising:
   at least one first coupling area coupling element, wherein the first connecting element is coupled with the at least one support element in the first coupling area by the at least one first coupling area coupling element; or
   at least one second coupling area coupling element, wherein the second connecting element is coupled with the at least one support element in the second coupling area by at the least one coupling element; or both at least one first coupling area coupling element and at least one second coupling area coupling element, wherein the first connecting element is coupled with the support element in the first coupling area by the at least one first coupling area coupling element and the second connecting element is coupled with the support element in the second coupling area by at the least one coupling element.

7. A support element in accordance with claim 6, wherein the at least one first coupling area coupling element comprises a bolt and the at least one second coupling area coupling element comprises a bolt.

8. A support element in accordance with claim 1, wherein the light metal die-cast material is comprised of at least one of AlSi9Cu3, AlMg3, AlMg5, AlMg9, AlSi10Mg, AlSi12Cu1, AlSi12.

9. A drive system for a vehicle, the drive system comprising:
    a drive unit;
    an internal combustion engine;
    an exhaust system guiding combustion waste gases away from the internal combustion engine; and
    at least one support element for a support unit for supporting an exhaust system of a vehicle, the at least one support element being made of light metal die-cast material, wherein the at least one support element has at least one predetermined breaking point range defined by a cross-sectional contraction having a rotationally symmetrical concave shape, wherein the at least one predetermined breaking point range of the at least one support element is further defined by a configuration comprising a recess or an opening traversing the support element or any combination of a recess and an opening traversing the support element.

10. A drive system in accordance with claim 9, wherein the at least one support element is arranged for supporting the exhaust system in relation to the internal combustion engine or the drive unit further comprises a transmission and the at least one support element is arranged for supporting the exhaust system in relation to the transmission, or the at least one support element is arranged for supporting a first area of the exhaust system in relation to a second area of the exhaust system or any combination of the at least one support element arranged for supporting the exhaust system in relation to the internal combustion engine and the drive unit further comprising a transmission and the at least one support element arranged for supporting the exhaust system in relation to the transmission, and the at least one support element is arranged for supporting a first area of the exhaust system in relation to a second area of the exhaust system.

11. A drive system in accordance with claim 9, wherein the light metal die-cast material contains Al, or Mg or both Al and Mg, Si or Cu or Zn or any combination of Si or Cu and Zn.

12. A drive system in accordance with claim 9, wherein the light metal die-cast material is comprised of at least one of AlSi9Cu3, AlMg3, AlMg5, AlMg9, AlSi10Mg, AlSi12Cu1, AlSi12.

13. A drive system in accordance with claim 9, wherein the light metal die-cast material is an Al and Si alloy or an Al and Mg alloy or an Al and Si and Mg alloy or an Al and Si and Cu alloy or any combination of an Al and Si alloy, an Al and Mg alloy, an Al and Si and Mg alloy and an Al and Si and Cu alloy.

14. A drive system in accordance with claim 9, further comprising:
    a first connecting element rigidly connected to a first system area and coupled with the at least one support element in a first coupling area; and
    a second connecting element rigidly connected to a second system area and coupled with the at least one support element in a second coupling area.

15. A drive system in accordance with claim 14, further comprising:
    at least one first coupling area coupling element, wherein the first connecting element is coupled with the at least one support element in the first coupling area by the at least one first coupling area coupling element; or
    at least one second coupling area coupling element, wherein the second connecting element is coupled with the at least one support element in the second coupling area by at the least one coupling element; or
    both at least one first coupling area coupling element and at least one second coupling area coupling element, wherein the first connecting element is coupled with the support element in the first coupling area by the at least one first coupling area coupling element andthe second connecting element is coupled with the support element in the second coupling area by at the least one coupling element.

16. A drive system in accordance with claim 15, wherein the at least one first coupling area coupling element comprises a bolt and the at least one second coupling area coupling element comprises a bolt.

17. A support unit for supporting an exhaust system of a vehicle, the support unit comprising:
    at least one support element made of light metal die-cast material, the at least one support element comprising a cross-sectional contraction having a rotationally symmetrical concave shape, the rotationally symmetrical concave shape defining at least one predetermined breaking point range, wherein the at least one predetermined breaking point range of the at least one support element is further defined by a configuration comprising a recess or an opening traversing the support element or any combination of a recess and an opening traversing the support element.

\* \* \* \* \*